US007469689B1

(12) United States Patent
Jones et al.

(10) Patent No.: US 7,469,689 B1
(45) Date of Patent: Dec. 30, 2008

(54) FLUID COOLED SUPERCHARGER

(76) Inventors: Daniel W. Jones, 14801 W. 114th Ter., Lenexa, KS (US) 66215; Michael A. Carlson, 7701 W. 156th Pl., Stanley, KS (US) 66223

( * ) Notice: Subject to any disclaimer, the term of this patent is extended or adjusted under 35 U.S.C. 154(b) by 0 days.

(21) Appl. No.: 11/162,426

(22) Filed: Sep. 9, 2005

Related U.S. Application Data

(60) Provisional application No. 60/608,251, filed on Sep. 9, 2004.

(51) Int. Cl.

| | |
|---|---|
| ***F02B 33/00*** | (2006.01) |
| ***F02B 29/04*** | (2006.01) |
| ***F02B 39/00*** | (2006.01) |
| ***F02B 39/04*** | (2006.01) |
| ***F01D 25/28*** | (2006.01) |
| ***F01D 1/02*** | (2006.01) |
| ***F01D 9/00*** | (2006.01) |
| ***F04D 29/58*** | (2006.01) |
| ***F16M 11/00*** | (2006.01) |
| ***F16M 13/00*** | (2006.01) |
| ***B23K 31/00*** | (2006.01) |

(52) U.S. Cl. ................ 123/559.1; 123/41.31; 60/605.1; 415/204; 415/211.1; 415/178; 248/200; 248/554; 228/124.5

(58) Field of Classification Search ............. 123/559.1, 123/41.31; 60/605.1, 568; 415/110, 204–205, 415/212.1, 211.1, 178; 417/406–407, 362, 417/423.14–423.15; 440/88 L, 88 F; 248/200, 248/554; 228/124.5; 290/52; *F02B 29/04, F02B 77/11, 39/00, 39/04; F01D 25/28; F04D 29/58*
See application file for complete search history.

(56) References Cited

U.S. PATENT DOCUMENTS 1,966,855 A * 7/1934 Gregg ..................... 415/211.1
2,384,251 A 9/1945 Hill ............................ 415/178
2,481,236 A * 9/1949 Patterson .................... 165/125
2,682,365 A * 6/1954 Pielstick ..................... 415/178
2,854,296 A * 9/1958 Fritz et al. ................... 184/6.1
2,973,894 A * 3/1961 Kimball et al. ............. 415/204
3,291,966 A * 12/1966 Bunting ...................... 392/379
3,405,913 A 10/1968 Chatfield et al.
3,673,799 A 7/1972 Audiffred et al.
3,827,236 A 8/1974 Rust .......................... 60/605.1
3,829,235 A 8/1974 Woollenweber, Jr. ..... 415/211.1
3,966,351 A 6/1976 Sproule ...................... 415/110
3,998,055 A 12/1976 Bradford et al.
4,068,612 A 1/1978 Meiners ..................... 60/605.1

(Continued)

FOREIGN PATENT DOCUMENTS

DE 10001063 A1 7/2001

(Continued)

*Primary Examiner*—Thai-Ba Trieu
(74) *Attorney, Agent, or Firm*—Hovey Williams LLP

(57) ABSTRACT

A forced air induction system for use with a powered vehicle is disclosed as including a centrifugal supercharger supported by the vehicle's engine and a recirculating induction coolant system that cools the supercharger and the compressed induction fluid provided by the supercharger. The induction coolant system operates by providing coolant to the supercharger and to an intercooler of the forced air induction system. The supercharger case includes internal passageways for cooling the transmission and compressor. The forced air induction system further includes spacers and radiant heat shields for rejecting heat transferred conductively and radiantly from the engine.

17 Claims, 8 Drawing Sheets

U.S. PATENT DOCUMENTS

| | | | | | |
|---|---|---|---|---|---|
| 4,107,927 | A | | 8/1978 | Gordon, Jr. et al. | |
| 4,125,345 | A | | 11/1978 | Yoshinaga et al. | |
| 4,171,936 | A | | 10/1979 | Hageman et al. | |
| RE30,333 | E | | 7/1980 | Gordon, Jr. et al. | |
| 4,289,955 | A | * | 9/1981 | Seeley | 219/532 |
| 4,367,626 | A | | 1/1983 | Schwartzman | |
| 4,422,295 | A | | 12/1983 | Minami et al. | |
| 4,463,564 | A | | 8/1984 | McInerney | |
| 4,561,387 | A | | 12/1985 | Körkemeier et al. | 123/41.31 |
| 4,569,645 | A | | 2/1986 | Asami et al. | |
| 4,599,862 | A | | 7/1986 | Bergeron | |
| 4,608,827 | A | | 9/1986 | Hasegawa et al. | 123/41.31 |
| 4,735,556 | A | | 4/1988 | Fujikake et al. | 417/407 |
| 4,739,619 | A | | 4/1988 | Koerkemeier | 123/41.31 |
| 4,770,603 | A | | 9/1988 | Engels et al. | |
| 4,815,184 | A | | 3/1989 | Johnston et al. | |
| 4,829,939 | A | | 5/1989 | Veenemans et al. | |
| 4,907,954 | A | | 3/1990 | Slupski | |
| 4,927,336 | A | | 5/1990 | Rossmann et al. | |
| 4,928,637 | A | | 5/1990 | Naitoh et al. | |
| 4,936,097 | A | | 6/1990 | Rodgers | |
| 4,955,352 | A | | 9/1990 | Takeda | 123/559.1 |
| 4,958,600 | A | | 9/1990 | Janthur | 123/41.31 |
| 4,979,881 | A | | 12/1990 | Gutknecht | |
| 5,028,208 | A | | 7/1991 | Mitsubori et al. | |
| 5,046,930 | A | | 9/1991 | Lindstrom | |
| 5,105,793 | A | | 4/1992 | Winkelmann et al. | |
| 5,201,285 | A | | 4/1993 | McTaggart | |
| 5,224,459 | A | * | 7/1993 | Middlebrook | 123/559.1 |
| 5,261,356 | A | | 11/1993 | Takahashi et al. | |
| 5,275,133 | A | | 1/1994 | Sasaki et al. | |
| 5,392,604 | A | | 2/1995 | Nikula et al. | |
| 5,392,982 | A | * | 2/1995 | Li | 228/124.5 |
| 5,415,147 | A | | 5/1995 | Nagle et al. | |
| 5,579,900 | A | | 12/1996 | Pryor et al. | |
| 5,735,676 | A | | 4/1998 | Loos | 417/407 |
| 5,789,824 | A | | 8/1998 | Selfors et al. | 290/52 |
| 5,857,332 | A | | 1/1999 | Johnston et al. | |
| 5,870,894 | A | | 2/1999 | Woollenweber et al. | |
| 6,032,466 | A | | 3/2000 | Woollenweber et al. | |
| 6,085,527 | A | | 7/2000 | Woollenweber et al. | |
| 6,098,576 | A | | 8/2000 | Nowak, Jr. et al. | |
| 6,145,314 | A | | 11/2000 | Woollenweber et al. | |
| 6,213,062 | B1 | | 4/2001 | Kawase | 123/41.31 |
| 6,257,834 | B1 | | 7/2001 | Bremer et al. | 417/406 |
| 6,305,169 | B1 | | 10/2001 | Mallof | |
| 6,354,083 | B1 | | 3/2002 | Shuttleworth et al. | |
| 6,374,612 | B1 | | 4/2002 | Gladden et al. | |
| 6,415,759 | B2 | | 7/2002 | Ohrnberger et al. | |
| 6,416,281 | B1 | | 7/2002 | Bremer et al. | |
| 6,439,208 | B1 | | 8/2002 | Jones | |
| 6,478,016 | B1 | | 11/2002 | Roderique | |
| 6,478,469 | B1 | | 11/2002 | Jones | |
| 6,513,328 | B2 | | 2/2003 | Baeuerle et al. | |
| 6,526,751 | B1 | | 3/2003 | Moeckel | |
| 6,557,345 | B1 | | 5/2003 | Moeckel | |
| 6,601,807 | B1 | * | 8/2003 | Takahashi et al. | 248/200 |
| 6,647,934 | B2 | | 11/2003 | Marsh et al. | |
| 6,655,307 | B2 | | 12/2003 | Gokan | 123/559.1 |
| 6,659,089 | B2 | | 12/2003 | Gokan et al. | 123/559.1 |
| 6,669,393 | B2 | * | 12/2003 | Schilling | 248/554 |
| 6,674,464 | B1 | | 1/2004 | Mizutani et al. | |
| 6,676,464 | B2 | | 1/2004 | Gokan et al. | |
| 6,682,321 | B1 | | 1/2004 | Mukherjee et al. | 417/407 |
| 6,688,928 | B2 | | 2/2004 | Gokan et al. | 440/88 L |
| 6,746,288 | B2 | | 6/2004 | Gokan | 440/88 F |
| 6,764,279 | B2 | | 7/2004 | Meshenky | |
| 2003/0015126 | A1 | | 1/2003 | Gokan | |
| 2003/0015182 | A1 | | 1/2003 | Gokan et al. | |
| 2003/0017760 | A1 | | 1/2003 | Gokan et al. | |
| 2003/0032345 | A1 | | 2/2003 | Gokan et al. | |
| 2003/0079728 | A1 | | 5/2003 | Marsh et al. | |
| 2003/0190242 | A1 | * | 10/2003 | Anderson | 417/362 |
| 2004/0109760 | A1 | | 6/2004 | Jones | |
| 2005/0047945 | A1 | * | 3/2005 | Metzger | 417/423.14 |
| 2007/0101713 | A1 | * | 5/2007 | Battig et al. | 60/598 |

FOREIGN PATENT DOCUMENTS

| | | | | |
|---|---|---|---|---|
| EP | 1375925 | A2 | * | 1/2004 |
| GB | 2182428 | A | * | 5/1987 |
| GB | 2400410 | A | * | 10/2004 |
| JP | 11148365 | A | * | 6/1999 |
| JP | 2003097278 | A | | 4/2003 |
| JP | 2005036664 | A | * | 2/2005 |
| JP | 2006291845 | A | * | 10/2006 |
| WO | WO 2005111382 | A1 | * | 11/2005 |

* cited by examiner

FLUID COOLED SUPERCHARGER

RELATED APPLICATIONS

This application claims the priority of Provisional Application Ser. No. 60/608,251, filed Sep. 9, 2004, entitled FLUID COOLED SUPERCHARGER, which is hereby incorporated by reference herein.

BACKGROUND OF THE INVENTION

1. Field of the Invention

The present invention relates generally to the field of superchargers. More specifically, the present invention concerns a supercharger for providing induction fluid to an engine, where the supercharger is thermally insulated from the engine. The present invention also concerns an air induction system for an engine that includes a supercharger and a coolant system dedicated to the air induction system.

2. Discussion of Prior Art

Superchargers in air induction systems generally operate at temperatures above ambient. In particular, it is known in the art that the compression provided by a supercharger increases the temperature of the air charge as well as its pressure due to thermodynamic effects. Such heating of the air charge is undesirable because it reduces the air density and, thus, the overall mass air flow of the compressor. Moreover, other sources of heat exist in virtually every supercharger application. For example, the supercharger (and therefore the charge air) is often heated radiantly and conductively by the engine. Exhaust components within the engine compartment can also undesirably heat the charge air.

It is known in the art to cool the compressed air charge provided by a supercharger. Intercoolers, for example, are well known in the art for cooling compressed air in air induction systems. However, intercoolers add cost and reliability concerns to the induction system, as well as causing a significant pressure drop in the compressed induction fluid.

These problems are magnified with highly efficient mechanically driven superchargers (e.g., centrifugal superchargers) operating with charge temperatures as low as 150° F. Those ordinarily skilled in the art will also appreciate that turbochargers have significantly different operating parameters, with exhaust drive gases having temperatures as high as 1500° F., air charge temperatures being as high as 300° F., and coolant systems for the turbocharger utilizing engine coolant normally having a temperature around 200° F.

SUMMARY OF THE INVENTION

The present invention provides a fluid cooled supercharger that does not suffer from the problems and limitations of the prior art superchargers detailed above.

In particular, a first aspect of the present invention concerns an improved air induction system in a powered vehicle including an engine. The improved air induction system broadly includes a supercharger and a supercharger support. The supercharger is mechanically driven by the engine to deliver compressed induction fluid to the engine. The supercharger includes a case that presents a compressor chamber in which induction fluid is compressed. The supercharger support is connected to the case to rigidly support the supercharger on the engine. The support includes a non-metal thermal-insulating portion. The thermal-insulating portion serves to thermally insulate the supercharger from conductive heating of the case by the engine.

A second aspect of the present invention concerns an air induction system for delivering compressed induction fluid to an engine, wherein the engine is cooled by a closed-loop engine coolant system. The air induction system broadly includes a supercharger and a recirculating induction coolant system. The supercharger is configured to be mechanically driven by the engine and includes a case that presents a transmission chamber. The supercharger includes a transmission drivingly connectable to the engine, with the transmission located at least substantially within the transmission chamber. The case presents a transmission coolant passageway adjacent the transmission chamber. The recirculating induction coolant system is configured to provide supercharger coolant separate from the engine coolant system. The recirculating induction coolant system is fluidly connected to the transmission passageway and operable to recirculate coolant through the transmission passageway.

A third aspect of the present invention concerns an air induction system for delivering compressed induction fluid to an engine, wherein the engine is cooled by a closed-loop engine coolant system. The air induction system broadly includes a centrifugal supercharger and a recirculating induction coolant system. The centrifugal supercharger is configured to be mechanically driven by the engine. The supercharger includes a case that presents a compressor chamber. The compressor chamber includes a volute section. The supercharger further includes a rotatable impeller within the compressor chamber and is operable to compress induction fluid when powered by the engine. The case presents a compressor coolant passageway extending at least partly along the volute section of the compressor chamber. The recirculating induction coolant system is configured to provide supercharger coolant separate from the engine coolant system. The induction coolant system is fluidly connected to the compressor passageway and operable to recirculate coolant through the compressor passageway.

A fourth aspect of the present invention concerns an air induction system for delivering compressed induction fluid to an engine, wherein the engine is cooled by a closed-loop engine coolant system. The air induction system broadly includes a centrifugal supercharger and a recirculating induction coolant system. The centrifugal supercharger is configured to be mechanically driven by the engine. The supercharger includes a case that presents a compressor chamber. The case includes a wall that defines a volute section of the compressor chamber. The supercharger further includes a rotatable impeller within the compressor chamber and is operable to compress induction fluid when powered by the engine. The case presents a compressor coolant passageway that is defined at least partly by the wall. The compressor passageway extends along at least part of the volute section of the compressor chamber. The recirculating induction coolant system fluidly connects to the compressor passageway and is operable to recirculate coolant through the compressor passageway. The case further includes a plurality of ridges projecting from the wall into the at least part of the volute section and thereby is configured to improve the transfer of heat from the compressed induction fluid to the coolant.

A fifth aspect of the present invention concerns an air induction system for delivering compressed induction fluid to an engine, wherein the engine is cooled by a closed-loop engine coolant system. The air induction system broadly includes a supercharger, an intercooler, and a recirculating induction coolant system. The supercharger is operable to compress induction fluid when mechanically driven by the engine. The supercharger includes a case that presents a first internal coolant passageway. The intercooler is in fluid communication with the compressor to receive the compressed induction fluid. The intercooler includes a second internal coolant passageway. The recirculating induction coolant system is fluidly connected to the first and second coolant passageways and is operable to recirculate coolant through the passageways.

A sixth aspect of the present invention concerns an air induction system for delivering compressed induction fluid to an engine, wherein the engine is cooled by a closed-loop engine coolant system. The air induction system broadly includes a centrifugal supercharger and a recirculating induction coolant system. The centrifugal supercharger is operable to compress induction fluid when mechanically driven by the engine. The supercharger includes a case that presents a compressor chamber. The supercharger further includes a rotatable impeller within the compressor chamber and is operable to compress induction fluid when powered by the engine, with the impeller presenting an exducer. The compressor chamber includes a volute section configured to receive induction fluid from the exducer of the impeller. The case includes a vaned diffuser ring fluidly interposed between the impeller exducer and the volute section of the compressor chamber. The vaned diffuser ring includes a plurality of circumferentially spaced vanes, each being hollow to present a fluid path therein. The case presents a pair of diffuser coolant passageways extending around the diffuser on opposite sides thereof, such that the fluid path of each of the hollow vanes intercommunicates the passageways. The recirculating induction coolant system is fluidly connected to the diffuser coolant passageways and operable to recirculate coolant through the passageways and fluid paths.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 8:
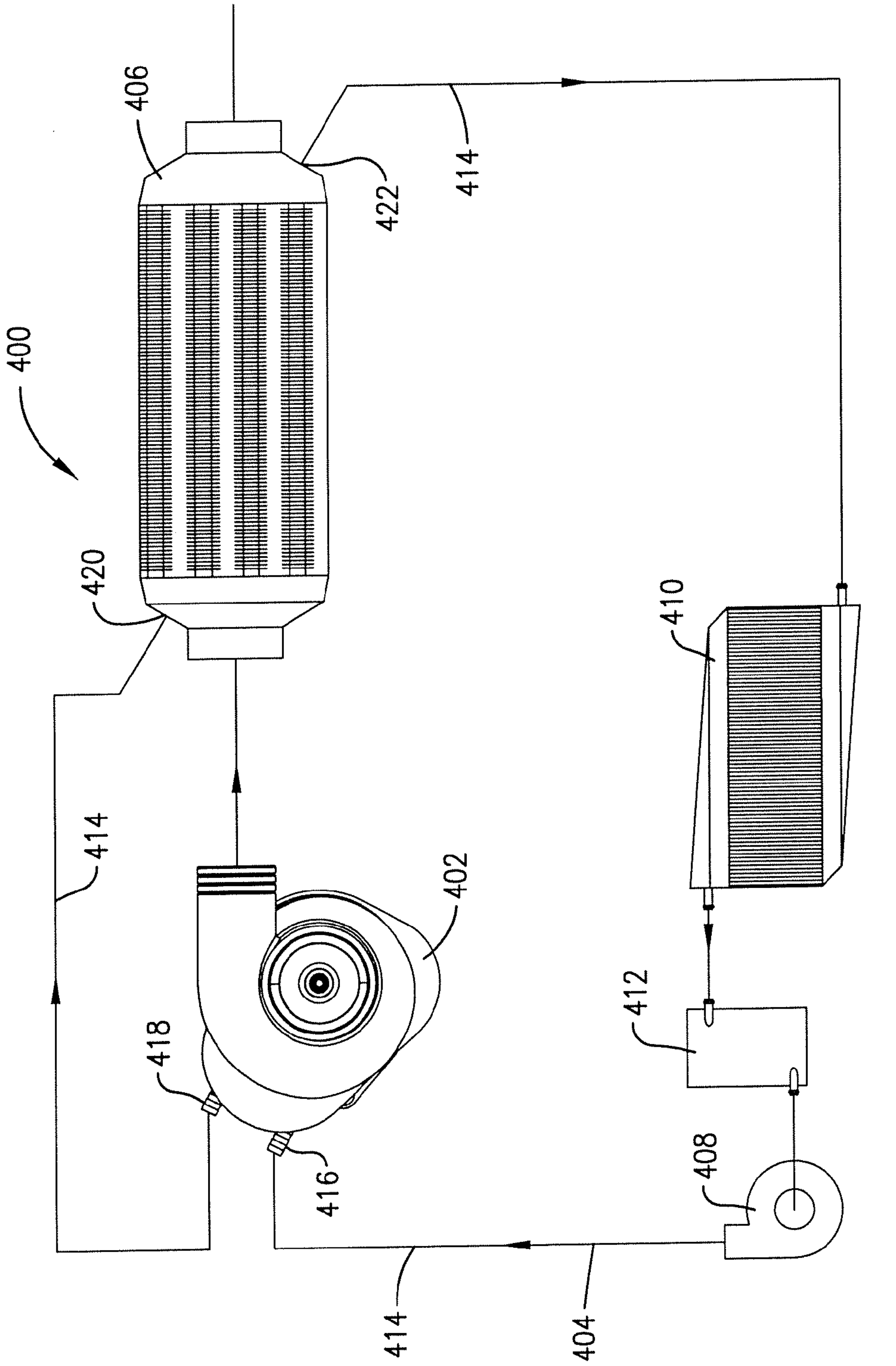
Figure 9:
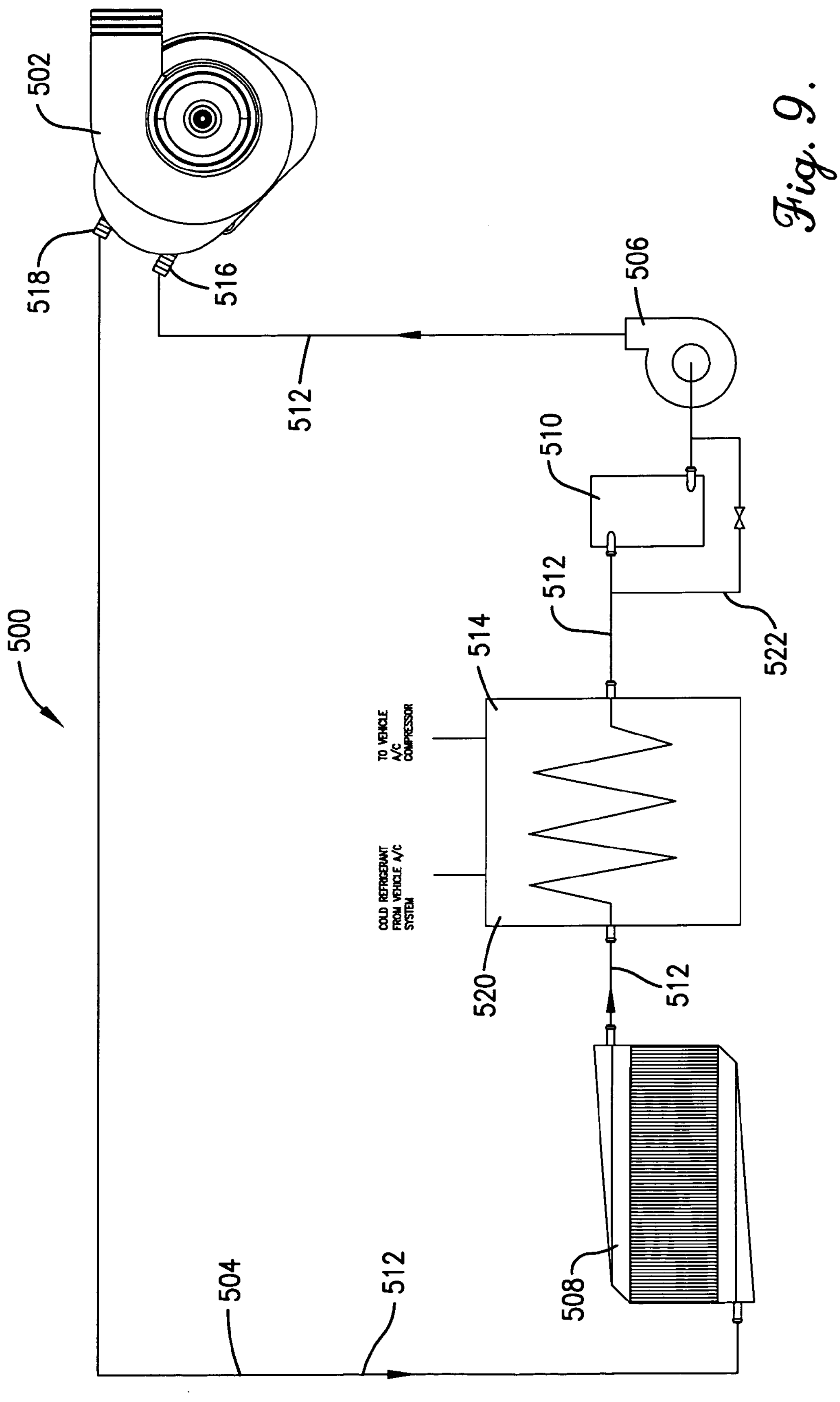

FIG. 8 is a schematic fragmentary view of a second alternative embodiment of the forced air induction system showing the recirculating induction coolant system providing coolant to the supercharger, the intercooler fluidly communicating with the supercharger, and coolant being provided to the supercharger and the intercooler; and FIG. 9 is a schematic fragmentary view of a third alternative embodiment of the forced air induction system, showing a recirculating induction coolant system providing coolant to the supercharger, with the coolant being cooled by a secondary coolant-to-refrigerant heat exchanger.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 1:
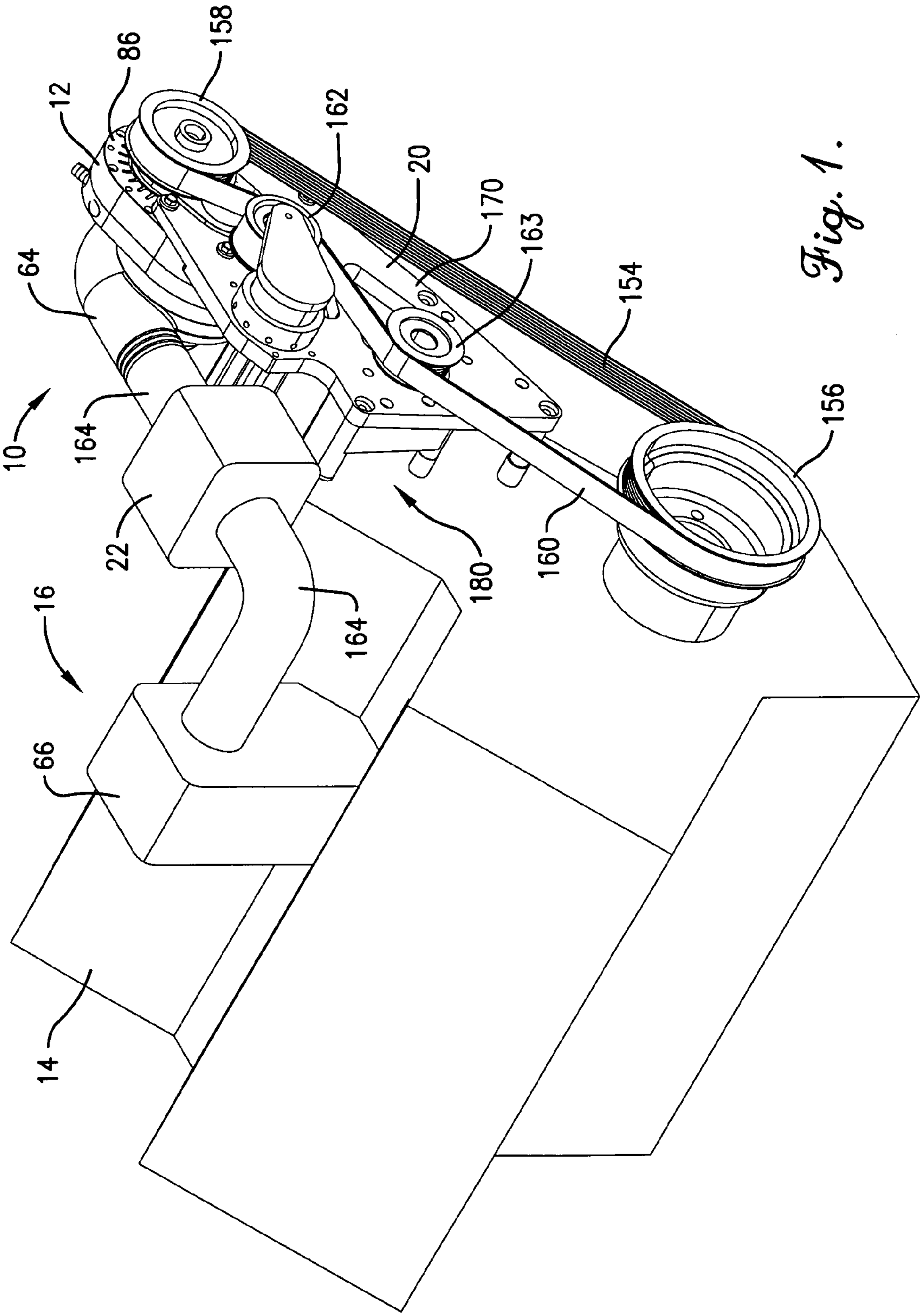
FIG. 1 is an isometric view of a powered vehicle including a forced air induction system constructed in accordance with the principles of the present invention.

FIG. 1 illustrates a forced air induction system 10 utilizing a supercharger 12 constructed in accordance with a preferred embodiment of the present invention. The induction system 10 illustrated in FIG. 1 is shown in use with an internal combustion engine 14 to provide a supercharged engine unit 16. While the illustrated supercharger 12 is preferably a centrifugal supercharger, it is consistent with certain aspects of the present invention to employ other types of superchargers such as another type of dynamic compressor or a positive displacement compressor.

The supercharged engine unit 16 is further illustrated in use in a powered vehicle 18 as the vehicle's prime mover. The powered vehicle 18 could be an automobile, a motorcycle, a boat, or other similar device without departing from the principles of the present invention. Furthermore, the supercharged engine unit 16 of the present invention is equally applicable in other applications, such as power generation. Moreover, certain principles of the present invention are equally useful in applications other than supercharging, such as in industrial compressor applications.

Figure 3:
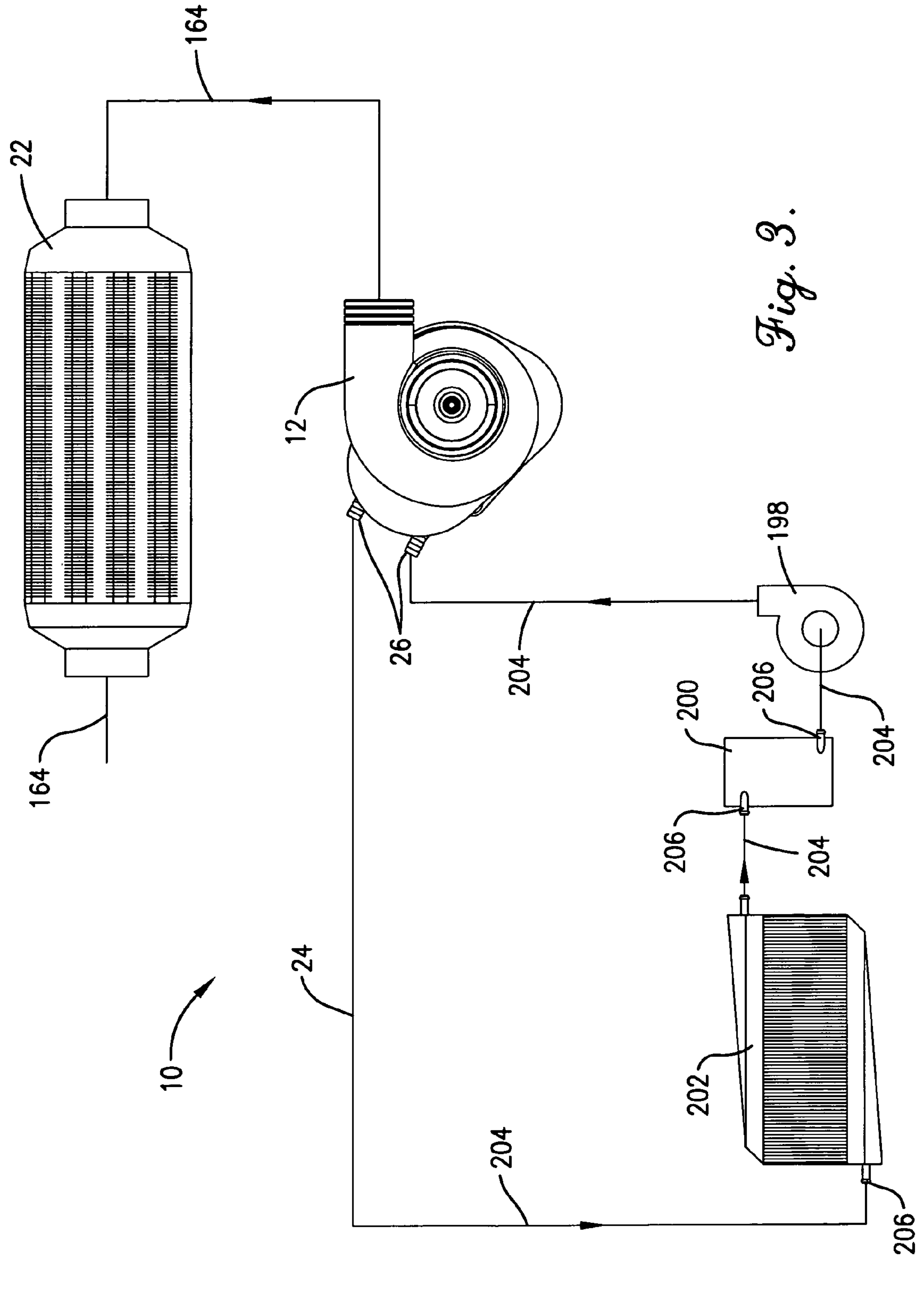
FIG. 3 is a schematic fragmentary view of the forced air induction system depicted in FIGS. 1 and 2, showing the recirculating induction coolant system providing coolant to the supercharger, and an intercooler fluidly communicating with the supercharger.

As shown in FIGS. 1 and 3, the forced air induction system 10 broadly includes the supercharger 12, a supercharger support 20, an intercooler 22, and a recirculating induction coolant system 24. The recirculating induction coolant system 24 is fluidly connected to the supercharger 12 at fittings 26. The preferred induction coolant system 24 will be described in more detail shortly. In addition, there are a number of alternative embodiments of the present invention (which will be described) having alternatively configured induction coolant systems.

Figure 4:
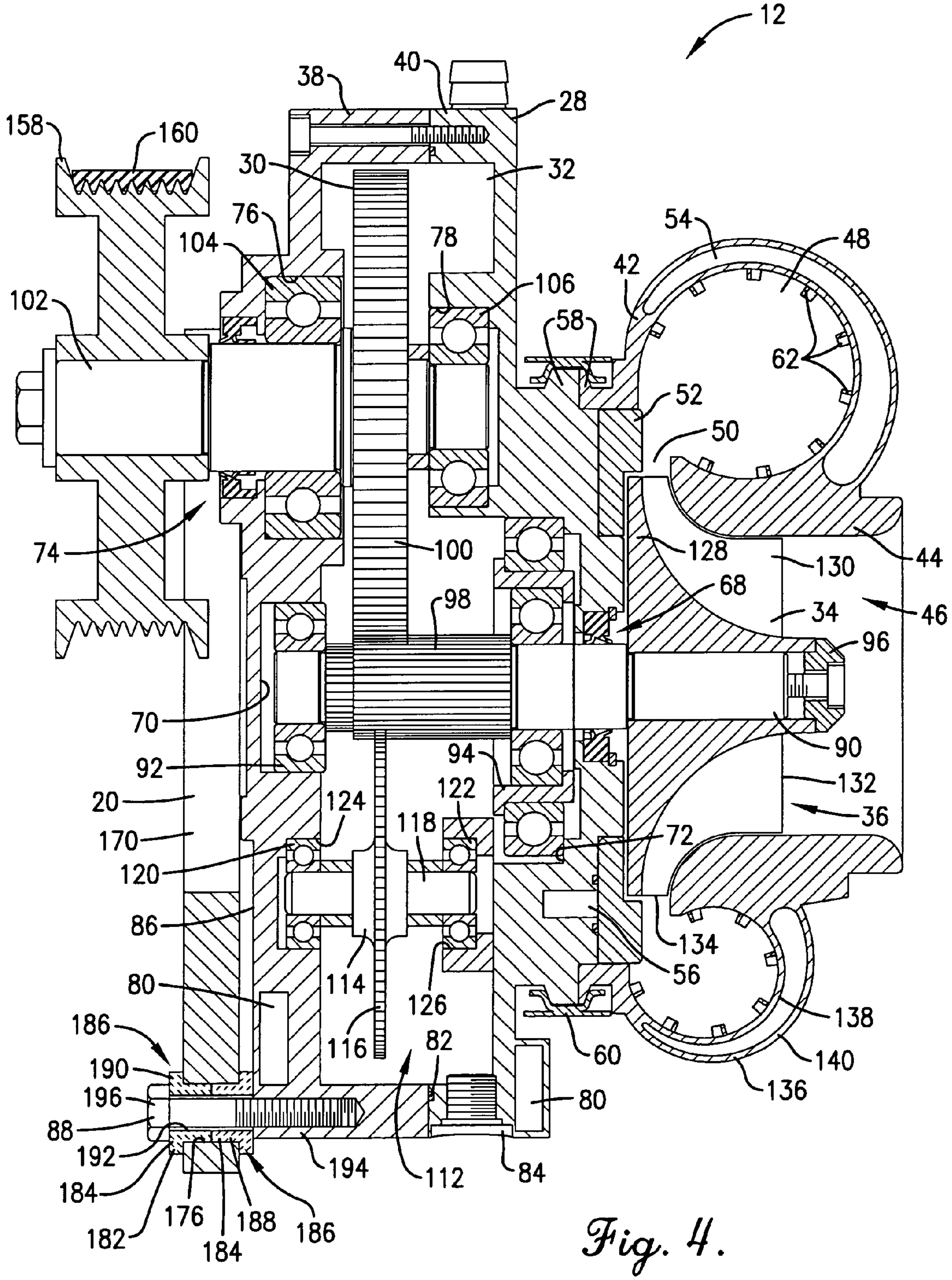
FIG. 4 is an enlarged cross-sectional view of the forced air induction system taken along line 4-4 in FIG. 2.

Turning to FIG. 4, the supercharger 12 broadly includes a case 28, a transmission 30 at least substantially housed within a transmission chamber 32, and an impeller 34 located within a compressor chamber 36. The case 28 of the illustrated supercharger 12 includes three main sections 38,40,42 that are formed of any suitable material (e.g., machined and polished aluminum) and interconnected as will be described. In the preferred form, the case sections 38,40 cooperatively define the transmission chamber 32. Furthermore, the case sections 40,42 cooperatively define the compressor chamber 36.

Those ordinarily skilled in the art will appreciate that incoming fluid (e.g., air, air/fuel mixture, etc.) is pressurized and accelerated within the compressor chamber 36. The case section 42 includes a substantially cylindrical inlet portion 44 (see FIG. 4). The cylindrical inlet portion 44 defines a central inlet opening 46 through which fluid enters the chamber 32. A filter (not shown) is attached directly to the supercharger 12 at inlet opening 42.

The case section 42 is configured in such a manner that a volute section 48 of the compressor chamber 36 extends circumferentially around the cylindrical inlet portion 44. The volute section 48 has a progressively increasing diameter. Between the volute section 48 and the inlet opening 42 is a diffuser section 50 of the chamber 32. The diffuser section 50 is further defined by a diffuser ring 52 attached to the case section 40. As will be discussed in more detail, the case section 42 defines a compressor coolant passageway 54, and the diffuser ring 52 and case section 40 cooperatively define a diffuser coolant passageway 56. Also, case sections 40,42 include opposing lips 58 which are tapered to receive a V-band clamp 60. The V-band clamp 60 acts against the tapered lips 58 to secure the case sections 40,42 to each other in a sealed relationship. Additionally, fins 62 protrude from the case section 42 into the volute section 48 and their use will be discussed shortly.

In the illustrated embodiment of FIG. 4, the diffuser section 50 is shown to be devoid of vanes. However, the use of a vaned diffuser will be shown in other embodiments below and discussed in more detail. Referring to FIG. 1, the volute section 48 of the compressor chamber 36 terminates at a tangential outlet opening 64, with the latter communicating with an engine intake 66. In this regard, fluid entering the illustrated compressor chamber 36 flows axially through the inlet opening 42, is propelled generally radially through the diffuser portion 50 into the volute section 48, and then directed along a generally circular path to the outlet opening 64.

Turning again to FIG. 4, an impeller shaft opening 68 that is concentric with the inlet opening 46 extends through the case section 40 from the compressor chamber 36 to the transmission chamber 32. Defined in the case sections 38,40 in axial alignment with the shaft opening 68 are a pair of opposed bearing assembly sockets 70,72.

The case section 38 similarly includes an input shaft opening 74 that is spaced upwardly from the bearing assembly socket 70. Similar to the impeller shaft opening 68, the input shaft opening 74 is axially aligned with opposed bearing assembly sockets 76,78 defined in the case sections 38,40. As will be discussed in more detail, the case sections 38,40 define transmission coolant passageways 80. An endless O-ring 82 retained within a continuous O-ring gland defined in the case section 40 provides a seal between the case sections 38,40. A reservoir port 84 is formed in the case section 40, the use of which will be discussed below.

As shown in FIGS. 1 and 4, the illustrated case section 38 presents a finned outer face 86 for promoting heat exchange between the transmission chamber 32, particularly the lubrication fluid, and atmosphere. The outer face 86 is also provided with a plurality of mounting bosses (not shown), each being tapped so that a mounting bolt 88 may be threaded therein to fasten the supercharger 12 to the support 20 as will be discussed.

As discussed in detail below, in the preferred embodiment, the transmission 30 includes an impeller shaft 90 rotatably supported by a pair of bearing assemblies 92,94 press fit within the respective sockets 70,72. In the usual manner, a wavy spring washer (not shown) is provided in at least one of the sockets 70,72. The bearing assembly 94 has an inventive construction that serves to extend bearing life without sacrificing speed of the shaft 90, cost or simplicity in construction. Such an arrangement is disclosed in commonly owned U.S. Pat. No. 6,478,469, issued Nov. 12, 2002, entitled VELOCITY VARIANCE REDUCING MULTIPLE BEARING ARRANGEMENT FOR IMPELLER SHAFT OF CENTRIFUGAL SUPERCHARGER, which is hereby incorporated by reference herein as is necessary for a full and complete understanding of the present invention.

The illustrated impeller shaft 90 projects through the opening 68 and into the compressor chamber 36. The impeller 34 is received on the end of the shaft 90, with the impeller 34 preferably being pressed onto the shaft 90 and retained thereon by a cap 96.

The impeller shaft 90 is preferably machined to present a pinion 98 located between the bearing assemblies 92,94. The pinion 98 intermeshes with a relatively larger gear 100 supported by an input shaft 102. The gear 100 is preferably keyed to the shaft 102, although these components may be fixedly interconnected in any other suitable manner. Similar to the impeller shaft 90, a pair of bearing assemblies 104,106 press fit within respective ones of the sockets 76,78 rotatably support the input shaft 102. Additionally, a wavy spring washer (not shown) is provided in the socket 76. The input shaft 102 projects through the shaft opening 74 and beyond the outer face 86 of the case section 38.

Those ordinarily skilled in the art will appreciate that the gear-type transmission 30 of the preferred embodiment produces noise that is noticeably greater than other drives, such as a belt drive. It has been determined that the impeller 34 actually amplifies the noise of the transmission 30, and the noise typically associated with a gear driven supercharger is normally considered undesirable. In this regard, the impeller shaft 90 may be designed to dampen noise that might otherwise propagate through the shaft 90 to the impeller 34. Such a shaft construction is disclosed in commonly owned U.S. Pat. No. 6,478,016, issued Nov. 12, 2002, entitled GEAR DRIVEN SUPERCHARGER HAVING NOISE REDUCING IMPELLER SHAFT, which is hereby incorporated by reference herein.

Those of ordinary skill in the art will also appreciate that, in some applications, the illustrated compressor may not incorporate a transmission within the case 28. Rather, the illustrated compressor may have an input shaft on which the impeller is mounted. In such an alternative, the input/impeller shaft would be coupled to a drive that is turning at the desired impeller speed. This drive may include a prime mover and may also include a similar transmission for achieving rotational speeds well above those of the prime mover.

Because lubrication fluid will be dispersed throughout the transmission chamber 32, seal assemblies 108,110 are provided at the shaft openings 68,74, respectively.

Those ordinarily skilled in the art will appreciate that the gears 98,100 and, in the preferred embodiment, the bearing assemblies 92,94,104,106 require lubrication during operation. The supercharger 12 is preferably self-contained such that lubrication of the transmission 30 is provided exclusively by a lubricant contained entirely within the transmission chamber 32. The transmission chamber 32 includes a lubricant reservoir portion 112 that is preferably located in a lower end of the transmission chamber 32. The quantity of lubricant within the transmission chamber 32 essentially defines the lubricant reservoir portion 112. Lubricant is added to and removed from the lubricant reservoir portion 112 through the port 84. The port 84 could also serve to fluidly connect the lubricant reservoir portion 112 to an externally located lubricant reservoir and circulating system.

A lubricant disc 114 projects into the reservoir portion 112 so as to be partly submerged in the lubricant. The illustrated disc 114 includes an outer toothed edge 116 that intermeshes with the pinion 98 so that the disc 114 is rotated by the transmission 30. Such an arrangement is disclosed in commonly owned U.S. Pat. No. 6,439,208, issued Aug. 27, 2002, entitled CENTRIFUGAL SUPERCHARGER HAVING LUBRICATING SLINGER, which is hereby incorporated by reference herein as is necessary for a full and complete understanding of the present invention.

As noted in the incorporated application, the disc 114 is suitably fixed (i.e., press fit) to a shaft 118 and positioned between a pair of bearing assemblies 120,122. The bearing assemblies 120,122 are press fit within respective sockets 124,126 and thereby serve to rotatably support the disc 114 within the transmission chamber 32. As with the other shaft assemblies, a wavy spring washer (not shown) is provided in one of the sockets.

Also noted in the incorporated application, the disc 114 creates a highly desirable lubricating mist within the transmission chamber 32. The mist ensures that the transmission components (i.e., the gears 98,100 and the bearing assemblies 92,94,104,106) are adequately lubricated without creating undesirable hydraulic separation forces.

However, the principles of the present invention are equally applicable to various other supercharger lubrication systems. That is, the present invention is preferably utilized with a self-contained supercharger having a partly filled transmission chamber, although the inventive features can be employed in a supercharger using an outside lubrication source or a supercharger having a fully filled transmission chamber. For example, it is entirely within the ambit of the present invention to lubricate the transmission with engine lubricant or a recirculating lubrication system dedicated to the supercharger. A number of suitable dedicated lubrication systems are disclosed in commonly owned U.S. patent application Ser. No. 10/641,619, filed Aug. 14, 2003, entitled CENTRIFUGAL COMPRESSOR WITH IMPROVED LUBRICATION SYSTEM FOR GEAR-TYPE TRANSMISSION, which is hereby incorporated by reference herein. The alternative supercharger may also include wicks or jet sprayers, rather than the slinging disc 114, for directing lubricant to the transmission components. It is again noted, however, that the illustrated lubrication system is most preferred. It is further noted that any one of the herein mentioned bearing assemblies may be pre-lubricated such that lubrication during operation is unnecessary.

As shown in FIG. 4, the supercharger 12 includes the rotatable impeller 34 located within the compressor chamber 36. The impeller 34 has a circular, solid base (or hub) 128 with a plurality of vanes 130 (or blades) extending out from the hub 128 and uniformly disposed around the impeller's circumference. The vanes 128 extend between and cooperatively define an inducer portion 132 of the impeller 34 and an exducer portion 134. Additional features of the preferred impeller 34 are further disclosed in commonly owned U.S. patent application Ser. No. 10/906,751 (the '751 application), filed Mar. 4, 2005, entitled CENTRIFUGAL COMPRESSOR HAVING ROTATABLE COMPRESSOR CASE INSERT, which is hereby incorporated by reference herein.

The impeller 34 is received within the chamber 32 so that the flat circular face of the hub 124 is received adjacent to the diffuser ring 52. In this orientation, the inducer portion 132 is adjacent to the inlet opening 46 and the impeller axis is aligned with the inlet opening 46. Moreover, the exducer portion 134 is adjacent to the diffuser section 50 and the impeller 34 is closely adjacent to the inlet portion 44 to form a slight gap. Further features concerning the preferred arrangement of the impeller 34 within the compressor chamber 36 are further disclosed in the incorporated '751 application.

As discussed above, the case section 42 defines the compressor coolant passageway 54. In more detail, the compressor coolant passageway 54 extends through the case section 42 along most of the circumference of the volute section 48 around the inlet portion 44, but does not extend endlessly around the volute section 48 so that the passageway 52 presents opposite ends (not shown) that form openings (not shown) in the case section 42. Furthermore, the passageway 52 is circumjacent to the volute section 48 to form a cooling jacket 136 with inner and outer jacket walls 138,140. The compressor coolant passageway 54 and walls 138,140 are preferably formed by casting methods known to those of ordinary skill in the art. The circumjacent position of the jacket 136 is radially outermost relative to the case section 42 to more effectively use space around the volute section 48. The outermost position of the compressor coolant passageway 54 improves cooling of induction fluid as it flows through the adjacent volute section 48. The open ends of the passageway 52 (defined in the case 28) are fluidly connected to the recirculating induction coolant system 24 as will be further described.

To further enhance heat transfer from the induction fluid in the volute section 48 to the coolant, fins 62 protrude from the case section 42 into the volute section 48. The fins 62 extend along the volute section 48, preferably being less than about 1 inch in length, such that fins 62 are spaced apart along the circumferential length of the volute section 48. Most preferably, the volute section 48 is provided with the short spaced apart fins 62 along its entire length. However, individual fins 62 could extend entirely along the length of the volute section 48 without departing from the principles of the present invention. In a preferred embodiment, the fins 62 are cast as part of the case section 42 but could also be welded in place or otherwise fixed to the internal surface of the case section 42 consistent with the principles of the present invention. In the illustrated embodiment, the fins 62 extend helically around the volute section 48 and preferably along the direction of compressed induction fluid flow. The fins 62 effectively increase the internal surface area of the case section 42 adjacent the volute section 48 to promote heat transfer. The fins 62 also promote flow in the volute section 48 to enhance fluid mixing and heat transfer.

Figure 5:
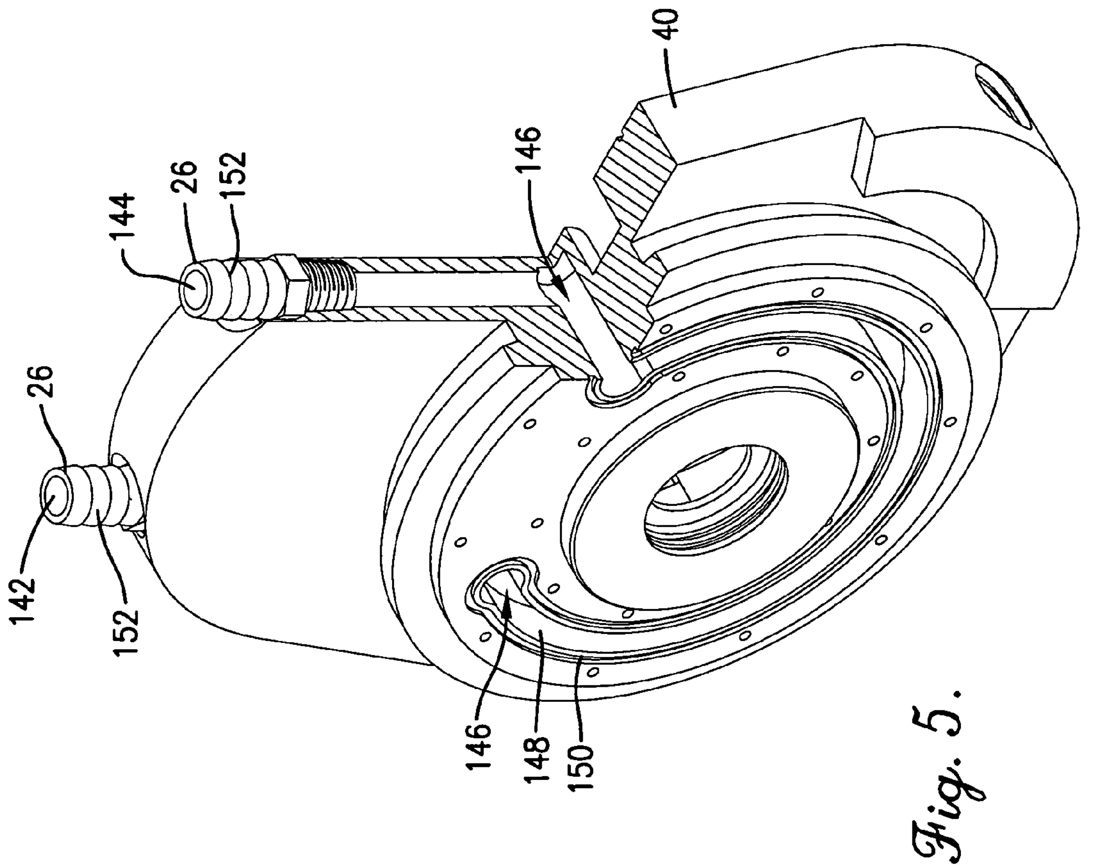
FIG. 5 is an enlarged fragmentary isometric view of section of the supercharger of the forced air induction system depicted in FIGS. 1-4.

As previously discussed, the diffuser ring 52 and case section 40 cooperatively define the diffuser coolant passageway 56. FIGS. 4 and 5 depict, in the preferred embodiment, the diffuser coolant passageway 56 that extends between two openings 142,144 in the case section 40. The diffuser coolant passageway 56 extends downwardly from openings 142,144 toward horizontal portions 146 of the passageway 56. The horizontal portions 146 intersect with an arcuate portion 148 of the passageway 54 that is formed around the impeller shaft opening 68. An O-ring gland 150 surrounds the arcuate portion 148. Hydraulic fittings 26 are threadedly attached to openings 142,144 and, in the normal manner, include barbed ends 152 for receiving an end of a hydraulic hose (not shown) for connection to the recirculating induction coolant system 24 as will be discussed.

Referring back to FIG. 4, the case sections 38,40 define the transmission coolant passageways 80, which are preferably cast as part of the respective case sections 38,40. The transmission coolant passageways 80 are located adjacent to the lubricant reservoir portion 112 of the transmission chamber 32 to receive heat from the transmission fluid and the surrounding case 28. Again, the passageways 80 fluidly communicate with openings (not shown) for fluidly connecting to the induction coolant system 24 (preferably in a manner similar to the openings 142,144).

The illustrated passageways 54,56,80 are interconnected by fluid lines (not shown) external to the case 28 for fluid communication with the induction coolant system 24. Consistent with the scope of the present invention, these passageways 54,56,80 may also be used individually or in various combinations. Furthermore, the case 28 may be alternatively configured with internal porting to fluidly interconnect the passageways 54,56,80 without the use of external fluid lines.

Referring back to FIGS. 1 and 4, the forced air induction system 10 includes a drive unit 154 for drivingly and mechanically connecting the supercharger 12 to the engine 14. The illustrated drive unit 154 is a belt drive that preferably includes a drive sheave 156 fixed to a crankshaft (not shown) of the engine 14, a driven sheave 158 attached to and supported on the input shaft 102, a belt 160 entraining the sheaves 156 and 158, and idler sheaves 162,163 for adjustably tightening the belt 160. It will be appreciated that the principles of the present invention contemplate alternative drive units, beyond those already noted. For example, the drive unit could alternatively include a cogged belt or a chain interconnecting a pair of toothed sheaves or sprockets, respectively (all not shown).

Figure 2:
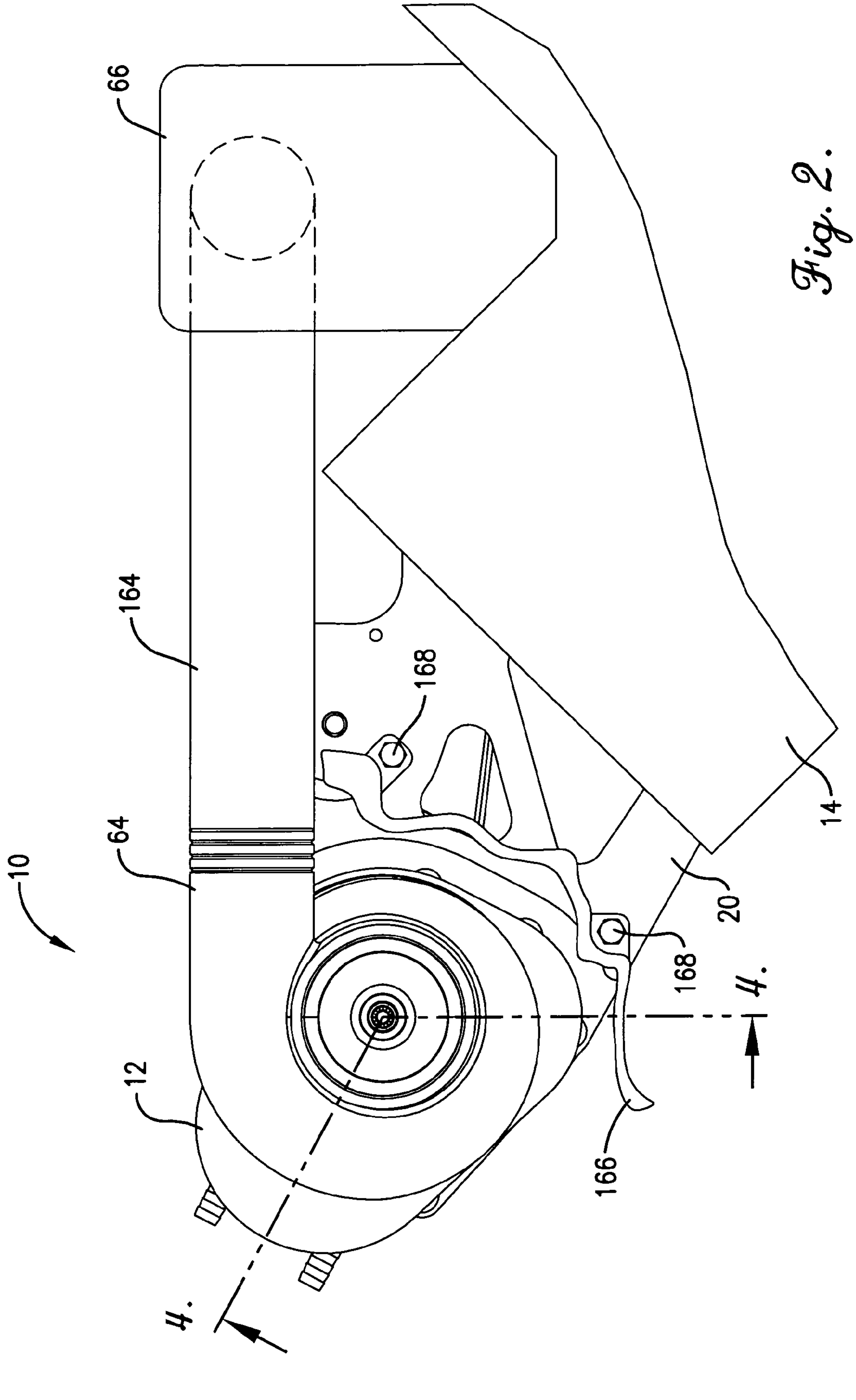
FIG. 2 is a fragmentary rear elevational view of the powered vehicle depicted in FIG. 1.

Referring to FIGS. 1 and 2, the illustrated induction system 10 further includes a conduit 164 fluidly communicating the supercharger 12, the intercooler 22, and the engine intake 66. Yet further, the induction system 10 includes a filter (not shown) preferably provided to filter air supplied to the supercharger 12. Although not illustrated, the supercharger 12 may alternatively communicate with a forwardly open conduit (not shown). An example of this application occurs in many powered vehicles, where the conduit extends toward the front of the powered vehicle, such that air flow to the supercharger 12 is facilitated when the vehicle is moving in a forward direction.

Turning to FIG. 2, the forced air induction system 10 further includes a radiant heat shield 166. The radiant heat shield 166 is preferably a foil radiant barrier with a layer of backing material, insulation, or a combination thereof. The backing material preferably includes kraft paper, polypropylene, or polyester. The radiant heat shield 166 is attached to the support 20 with fasteners 168 and is located between the supercharger 12 and the engine 14. In this manner, the radiant heat shield is able to reject heat that radiates from the engine 14 toward the supercharger 12.

Referring to FIGS. 1 and 4, the supercharger support 20 includes a rigid bracket 170 extending between the engine 14 and the supercharger 12. The bracket 170 has opposing faces 172,174 and is preferably manufactured of billet aluminum, but could alternatively be made of cast steel, or other materials without departing from the scope of the present invention. The bracket further includes holes 176 that are oversized for purposes that will be described shortly.

The bracket 170 is fixed to the engine 14 with fasteners (not shown) and stand-offs 178. In the illustrated embodiment of FIG. 1, the bracket 170 is fixed to a cylinder head 180 of the engine 14, but could also be fixed to other portions of the engine 14, such as the block.

The illustrated forced air induction system 10 preferably provides structure for thermally insulating the supercharger 12 from the engine 14. In particular, the support 20 includes a non-metal thermal insulating portion 181 to space the supercharger 12 from the engine 14 so that no metal-to-metal path is created between the supercharger 12 and engine 14. In this manner, heat that is generated by the engine 14 (due to combustion, friction, etc.), which is often conductively transmitted to components attached to the engine 14, is not conductively transmitted through the support 20 to the supercharger 12.

Referring to FIG. 4, the support 20 includes spacers 182. The illustrated spacers 182 each include a pair of aligned bushing segments 184 that project inwardly from opposite ends 186 of the respective hole 176. Each of the bushing segments 184 includes a cylindrical body 188 and a head portion 190 that is shaped like a washer. The bushing segments 184 further include a through-hole 192.

The illustrated spacers 182 are manufactured from a material with low thermal conductivity and high strength. In the preferred embodiment, the spacer 182 has a thermal conductivity of less than about 1 Btu/hr-ft-° F. More preferably, the spacers 182 are formed of a ceramic material. Most preferably, the ceramic material is a glass mica or a casting alumina.

Referring again to FIG. 4, the support 20 further includes fasteners 88 for removably attaching the bracket 170 to the supercharger 12. The bracket holes 176 are oversized relative to the fasteners 88 so that the body 188 of bushing segments 184 is received in the respective bracket hole 176 and the head portion 190 contacts one of the faces 172,174. The fasteners 88 are then arranged to extend through the respective bracket hole 176 and the through-holes 192 in adjacent bushing segments 184 and threadedly engage mounting bosses 194 of the case 28. The fastener 88 is tightened until a head 196 of the fastener 88 contacts the outermost bushing segment 184. In this manner, the spacers 182 serve as stand-offs to position the supercharger 12 relative to the bracket 170.

The support 20 attaches the supercharger 12 relative to the bracket 170 so that the sheaves 156,158 of the drive unit 154 are properly and rigidly aligned relative to each other. Furthermore, the support 20 prevents direct metal-to-metal contact between the supercharger 12 and engine 14 with the use of insulating spacers 182 (e.g., in the illustrated embodiment of FIG. 4, the bracket 170 and supercharger 12 appear to touch but in fact do not touch). In this regard, the support 20 serves to thermally insulate the engine 14 and supercharger 12. While the illustrated support 20 is preferred for providing thermal insulation, alternative supports including non-metal thermal insulating portions (such as will be described in an alternative embodiment below) can be incorporated into the forced air induction system 10 without departing from the scope of the present invention.

Turning to FIG. 3, the preferred embodiment of the forced air induction system 10 shows the recirculating induction coolant system 24. As will be discussed in more detail, the induction coolant system 24 is preferably dedicated to providing the forced air induction system 10 with coolant, but does not provide coolant to the engine 14 and furthermore is separate from the engine's dedicated coolant system. It will be appreciated, however, that certain aspects of the present invention do not require a dedicated closed loop recirculating system that is separate from the engine coolant system.

The illustrated intercooler 22 is an air-to-water heat exchanger of the type known to those of ordinary skill the art. The intercooler 22 receives compressed induction fluid from the supercharger 12 through the conduit 164 and then discharges the compressed induction fluid back into conduit 164 and into the engine intake 66 (shown in FIG. 1).

The induction coolant system 24 broadly includes a pump 198, a reservoir 200 containing coolant, a heat exchanger 202, and fluid lines 204 interconnecting these components. The illustrated pump 198 is a centrifugal pump, commonly known to those of ordinary skill in the art, although other types of pumps may be used. The reservoir 200 shown in FIG. 3 is a fluid-containing vessel also known to those of ordinary skill in the art. The illustrated reservoir 200 is preferably designed to separate air from the coolant. The illustrated reservoir 200 is also, preferably, a pressurized reservoir. However, the illustrated reservoir 200 could alternatively be designed to vent to the atmosphere without departing from the principles of the present invention. The coolant is preferably a water-based mixture including ethylene glycol or a similar additive for reducing the freezing point of the coolant. The preferred heat-exchanger 202 is an air-to-water heat-exchanger using finned tubes in the usual manner. These components are interconnected with fluid lines 204 and fittings 206.

The recirculating induction coolant system 24 illustrated in FIG. 3 provides the supercharger 12 with coolant. Fluid lines 318 are fluidly coupled to fittings 26 (as well as others not shown) in the case 28 so that the passageways 54,56,80 of the supercharger 12 fluidly communicate with the induction coolant system 24. The pump 198 draws coolant out of the reservoir 200 and forces the fluid through the supercharger 12. During operating conditions, the coolant is cool relative to the supercharger 12 and, thus, draws heat from the supercharger 12. The coolant is further forced through lines 204 into the heat-exchanger 202 where heat is drawn from the coolant into the ambient air. The coolant exits the heat-exchanger 202 and returns to the reservoir 200.

Figure 6:
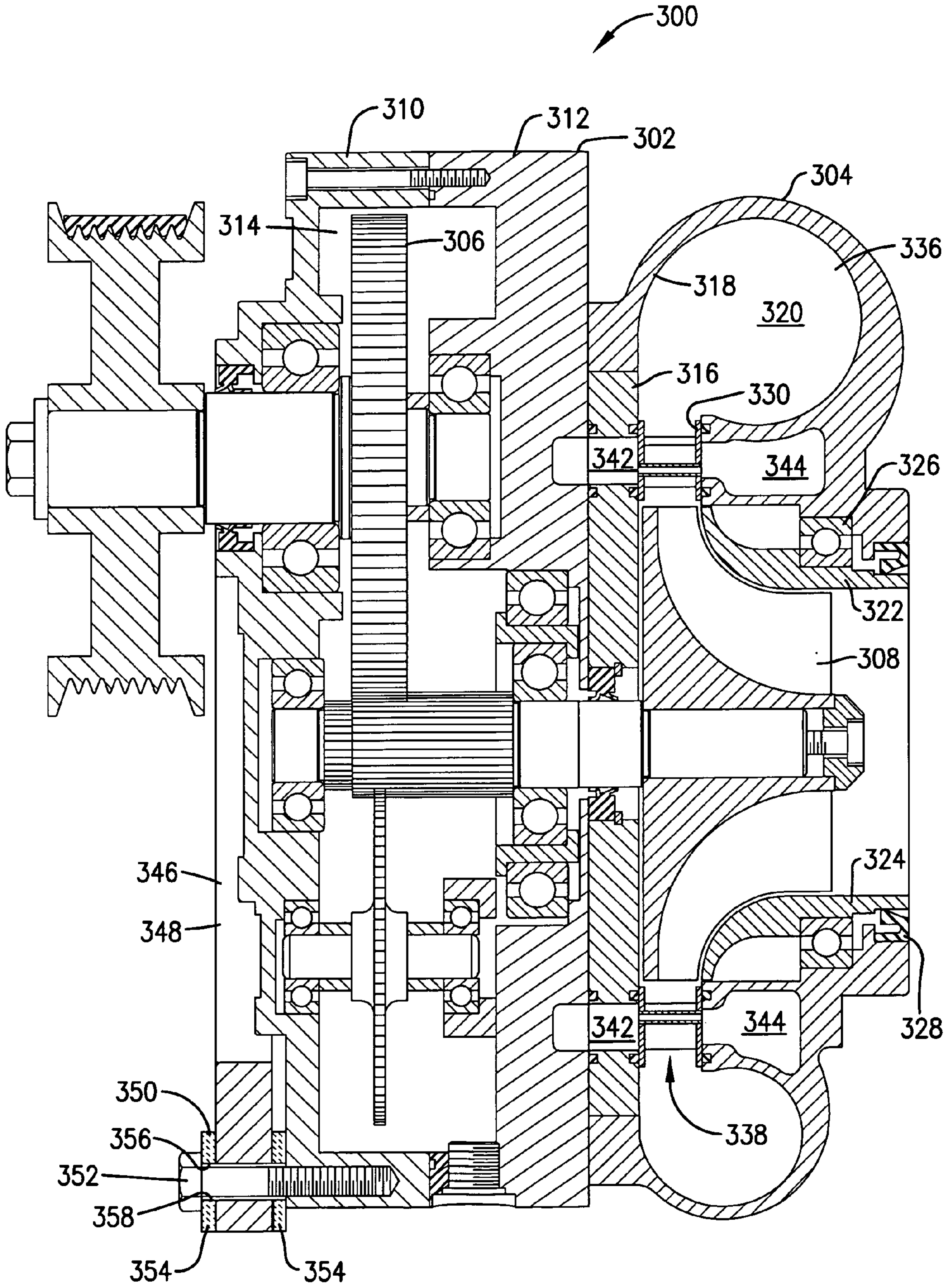
FIG. 6 is an enlarged cross-sectional view of an alternative embodiment of the forced air induction system, particularly depicting a flow-through diffuser ring for cooling the compressed induction fluid.

Referring to FIG. 6, an alternative preferred embodiment of a forced air induction system 300 is illustrated. The forced air induction system 300 includes an alternative supercharger 302 having a case 304, a transmission 306, and a rotatable impeller 308. The case 304, similar to the previous embodiment, includes case sections 310 and 312 that define a transmission chamber 314 and case sections 316 and 318 that define a compressor chamber 320. The case 304 further includes a rotating case insert assembly 322. The insert assembly 322 includes a rotating insert 324 that is radially supported on the case 304 by an insert bearing 326 and further includes a seal assembly 328. The inventive rotating case insert assembly 322 is particularly effective for preventing catastrophic failure of the impeller and generally extending the life of the compressor. The preferred rotating case insert arrangement is further disclosed in the incorporated '751 application.

While the illustrated case 304 and insert 324 are preferably formed of a suitable, durable material, such as polished aluminum, it is within the ambit of the present invention to utilize relatively softer materials for the insert 324 or on the inside of the case 304 (e.g., in place of the insert 324). For example, either the case 304 or the insert 324 may incorporate an insert, particularly surrounding the impeller, to desirably reduce the tolerances between the inside of the case 304 or the insert 324 and the moving impeller housed therein while reducing the risk of catastrophic failure by unintended impeller contact with either the case 304 or the insert 324. One suitable preferred soft material insert is disclosed in copending application for U.S. patent Ser. No. 10/349,411, filed Jan. 22, 2003, entitled A METHOD AND APPARATUS FOR INCREASING THE ADIABATIC EFFICIENCY OF A CENTRIFUGAL SUPERCHARGER (see U.S. Patent Publication No. 20040109760), which claims the priority of provisional U.S. Application Ser. No. 60/430,814, filed Dec. 4, 2002 and bearing the same title, both of which are hereby incorporated by reference herein.

Figure 7:
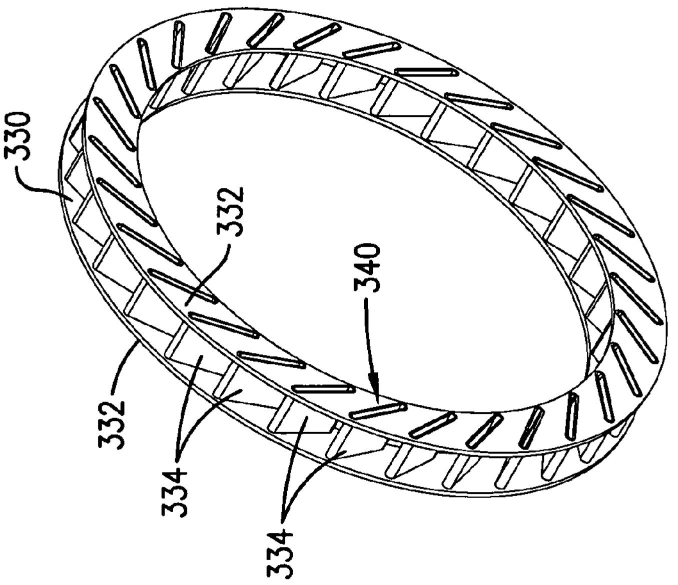
FIG. 7 is an enlarged fragmentary isometric view of the vaned diffuser ring depicted in FIG. 6.

Referring to FIGS. 6 and 7, the case 304 of the alternative supercharger 302 includes an alternative vaned diffuser ring 330. As perhaps best shown in FIG. 7, the vaned diffuser ring 330 includes opposing circular end plates 332 with a plurality of diffuser vanes 334 evenly spaced along the circumference of the vaned diffuser ring 330.

Referring back to FIG. 6, the compressor chamber 320 includes a volute section 336 and a diffuser section 338. The rotatable impeller 308 is again spaced within the compressor chamber 322. The vaned diffuser ring 330 is arranged between the impeller 308 and the volute section 336 and within the diffuser section 338. In the usual manner, the diffuser vanes 334 are arranged to efficiently direct flow out of the impeller 308 and into the volute section 336. The illustrated vanes 334 are also hollow along their length in order to each provide a fluid path 340.

The case sections 312,316,318 further define first and second internal diffuser coolant passageways 342,344. The first internal diffuser passageway 342 is spaced between the transmission chamber 314 and the diffuser section 338 and is in an abutting relationship to the diffuser ring 330 and fluidly communicates with the fluid paths 340. The second internal diffuser passageway 344, extends entirely along the volute section 336, and is spaced between the volute section 336 and the impeller 308. The second internal diffuser passageway 344 is also in an abutting relationship to the diffuser ring 330 and fluidly communicates with the fluid paths 340. The passageways 342,344 extend endlessly to engage the entire circumference of the diffuser ring. Each of the internal diffuser coolant passageways 342,344 is associated with a respective opening (not shown) in the case 304 for fluid communication with an induction coolant system (not shown).

In the illustrated supercharger 302, coolant flows within each of the passageways 342,344, but more importantly flows between the passageways 342,344 by flowing through the fluid paths 340 defined by the vaned diffuser ring 330. In this manner, heat within the compressed induction fluid may be removed as it passes through the vaned diffuser ring 330.

Referring again to FIG. 6, the alternative forced air induction system 300 includes a supercharger support 346 that supports the supercharger 302 similarly to the previous embodiment. The support 346 includes a bracket 348, spacers 350, and fasteners 352. However, the non-metal spacers 350 include flat segments 354 that are washer-shaped and each include a through-hole 356 for receiving the fastener 352. While the illustrated segments 354 are washer-shaped, the segments 354 on each side of the bracket 348 could alternatively include a plurality of the through-holes 356 and thereby form a unitary, elongated plate. The bracket 348 includes oversize holes 358 also for receiving the fastener 352. The holes 358 are preferably oversized so as to avoid metal-to-metal path contact between the bracket 348 and the fasteners 352 when assembled.

In the illustrated embodiment, the fasteners 352 extend through the spacers 350 and are threaded into the case 304 to secure the bracket 348 to the supercharger 302. The oversized holes 358 permit the fasteners to extend through the bracket 348 without touching the bracket so that no metal-to-metal path exists from the supercharger 302 to the bracket 348 or from the supercharger 302 to the engine (not shown) when the supercharger support 346 is assembled.

Turning to FIG. 8, a second alternative preferred embodiment of a forced air induction system 400 is illustrated. Similar to the preferred embodiments above, the system 400 includes a supercharger 402 and a recirculating induction coolant system 404 that is closed-loop and is in fluid communication with the supercharger 402 to supply coolant and to remove heat from the coolant. The system 400 further includes an intercooler 406 that is in fluid communication with the supercharger 402 to receive compressed induction fluid.

The supercharger 402 is a centrifugal supercharger and is preferably constructed in accordance with the preferred embodiments disclosed herein, particularly those including internal coolant passageways. However, with regard to this alternative system 400, the supercharger 402 could be variously configured to have an alternative compressor or alternative mechanical driving means without departing from the scope of the present invention.

The induction coolant system 404 includes a pump 408, a heat exchanger 410 for removing heat from the coolant, a reservoir 412 for containing the coolant, and lines 414 for interconnecting these components. In the illustrated embodiment, one of the lines 414 carries coolant from the pump 408 to the supercharger inlet port 416. As in any of the various embodiments discussed above, the supercharger 402 includes a passageway to permit coolant to flow from the supercharger inlet port 416 to a supercharger discharge port 418 so that heat may be transferred from the supercharger 402 to the coolant.

In the alternative preferred embodiment, another one of the lines 414 extends from the supercharger discharge port 418 along the indicated direction to an inlet port 420 of the intercooler 406. The intercooler 406 is preferably an air-to-water heat exchanger and is of the type known to those skilled in the art. An internal passageway (not shown) of the intercooler 406 permits coolant to flow from the inlet port 420 to a discharge port 422. This internal passageway is also in thermal communication with the compressed induction fluid as it passes through the intercooler 406 so that heat is transferred from the compressed induction fluid to the coolant. In this manner, heat generated by the process of compressing induction fluid may be removed at the supercharger 402 and at the intercooler 406.

The illustrated induction system 400 preferably incorporates an intercooler 406 that provides supplemental cooling of the compressed induction fluid. To this end, the preferred intercooler 406 is a heat exchanger having a relatively low cooling effectiveness. In other words, the required cooling capacity for the induction system 400 is achieved collectively by the supercharger 402 and the intercooler, thus permitting the cooling capacity of the intercooler 406 to be reduced. The intercooler 406 with reduced cooling capacity enables the intercooler 406 to have a less complicated internal design which further enables it to be less expensive, more durable, and to have a lower pressure drop between the coolant inlet and discharge. Furthermore, the intercooler 406 and supercharger 402 are cooled by a common dedicated recirculating coolant system that is separate from the engine coolant system.

Turning to FIG. 9, a third alternative preferred embodiment of a forced air induction system 500 is illustrated. Similar to the preferred embodiments above, the system 500 includes a supercharger 502 and a recirculating induction coolant system 504 that is closed-loop and is in fluid communication with the supercharger 502 to supply coolant and to remove heat from the coolant.

The supercharger 502 is a centrifugal supercharger and is preferably constructed in accordance with the preferred embodiments disclosed herein, particularly those including internal coolant passageways. However, with regard to this alternative system 500, the supercharger 502 could be variously configured to have an alternative compressor or alternative mechanical driving means without departing from the scope of the present invention.

Similar to the coolant systems previously disclosed, the induction coolant system 504 preferably includes a pump 506, a heat exchanger 508 for removing heat from the coolant, a reservoir 510 for containing the coolant, and lines 512 for interconnecting these components. However, the induction coolant system further includes an auxiliary refrigerant condenser 514 also for removing heat from the coolant. In the illustrated embodiment, one of the lines 512 carries coolant from the pump 506 to a supercharger inlet port 516. As in any of the various embodiments discussed above, the supercharger 502 permits coolant to flow from the supercharger inlet port 516 to a supercharger discharge port 518 so that heat may be transferred from the supercharger 502 to the coolant.

The refrigerant condenser 514 is a refrigerant-to-coolant heat exchanger that is part of a closed-loop refrigerant system 520. In the preferred embodiment, the refrigerant system 520 is an air-conditioning system of the usual type found in vehicles. Moreover, the illustrated forced air induction system 500 is installed in a vehicle (not shown) where the preferred refrigerant system 520 is part of the vehicle's original equipment. In this manner, the forced air induction system 500 utilizes the vehicle's cooling capability in the induction coolant system 504. However, it is entirely consistent with the principles of the present invention to use a refrigerant system separate from the vehicle.

The induction coolant system 504 further includes a reservoir bypass 522 including a bypass valve 524. The reservoir bypass 522 permits coolant to flow directly between the refrigerant condenser 514 to the pump 506.

The refrigerant condenser 514 provides the induction coolant system 504 with supplemental cooling capacity beyond that provided by the heat exchanger 508. In the preferred embodiment, the refrigerant system 520 of the vehicle normally operates to chill coolant in the induction coolant system 504 during conditions where low power demand is placed on the engine. In this manner, the refrigerant system 520 can further reduce the temperature of the reservoir 510 during those periods. However, the refrigerant system 520 may be alternatively configured to work on a continuous basis.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An air induction system for delivering compressed induction fluid to an engine, wherein the engine is cooled by a closed-loop engine coolant system, the air induction system comprising:

a centrifugal supercharger configured to be mechanically driven by the engine, said supercharger including a case that presents a compressor chamber, said case including a wall that defines a volute section of the compressor chamber, said supercharger including a rotatable impeller within the compressor chamber and operable to compress induction fluid when powered by the engine, said case presenting a compressor coolant passageway that is defined at least partly by the wall, said compressor passageway extending along at least part of the volute section of the compressor chamber; and a recirculating induction coolant system fluidly connected to the compressor passageway and operable to recirculate coolant through the compressor passageway, said case including a plurality of ridges projecting from the wall into said at least part of the volute section and thereby being configured to improve the transfer of heat from the compressed induction fluid to the coolant, said volute section presenting a generally circular cross-sectional shape to present an outer circumference, said ridges being spaced about the outer circumference of the volute section, said ridges each having a helical shape to facilitate flow of compressed induction fluid along the volute section.

2. The air induction system as claimed in claim 1, said ridges being shorter in length than the volute section, with the ridges being spaced lengthwise along the volute section.

3. The air induction system as claimed in claim 2, said ridges each presenting a rectangular cross-sectional shape that projects lengthwise radially inward from the wall.

4. The air induction system as claimed in claim 1, said recirculating induction coolant system being configured to provide supercharger coolant separate from the engine coolant system, said recirculating induction coolant system being configured to provide coolant at a temperature below that of the engine coolant system.

5. The air induction system as claimed in claim 4, said recirculating induction coolant system including a coolant reservoir for containing coolant, a pump for pumping coolant between the reservoir and the supercharger, and a heat exchanger for removing heat from the coolant.

6. The air induction system as claimed in claim 1;

a supercharger support connected to the case and configured to rigidly support the supercharger on the engine, said support including a non-metal thermal-insulating portion, said thermal-insulating portion configured to thermally insulate the supercharger from conductive heating of the case by the engine.

7. The air induction system as claimed in claim 1, said recirculating induction coolant system being configured to provide supercharger coolant separate from the engine coolant system.

8. An air induction system for delivering compressed induction fluid to an engine, wherein the engine is cooled by a closed-loop engine coolant system, the air induction system comprising:

a centrifugal supercharger configured to be mechanically driven by the engine, said supercharger including a case that presents a compressor chamber, said case including a wall that defines a volute section of the compressor chamber, said supercharger including a rotatable impeller within the compressor chamber and operable to compress induction fluid when powered by the engine, said case presenting a compressor coolant passageway that is defined at least partly by the wall, said compressor passageway extending along at least part of the volute section of the compressor chamber; and a recirculating induction coolant system fluidly connected to the compressor passageway and operable to recirculate coolant through the compressor passageway, said case including a plurality of ridges projecting from the wall into said at least part of the volute section and thereby being configured to improve the transfer of heat from the compressed induction fluid to the coolant, said case presenting a transmission chamber, said supercharger including a transmission drivingly connectable to the engine and operable to supply power to the impeller, with the transmission being located at least substantially within the transmission chamber, said case presenting a transmission coolant passageway adjacent the transmission chamber, said recirculating induction coolant system being fluidly connected to the transmission passageway and operable to recirculate coolant through the transmission passageway.

9. The air induction system as claimed in claim 8, said impeller presenting an exducer, said case including a vaned diffuser ring fluidly interposed between the impeller exducer and the volute section, said case presenting a diffuser coolant passageway in an abutting relationship to the diffuser ring, said recirculating induction coolant system being fluidly connected to the diffuser passageway and operable to recirculate coolant through the diffuser passageway.

10. The air induction system as claimed in claim 9, said compressor, transmission, and diffuser coolant passageways being fluidly isolated from one another within the case.

11. The air induction system as claimed in claim 8, said recirculating induction coolant system being configured to provide supercharger coolant separate from the engine coolant system, said recirculating induction coolant system being configured to provide coolant at a temperature below that of the engine coolant system.

12. The air induction system as claimed in claim 11, said recirculating induction coolant system including a coolant reservoir for containing coolant, a pump for pumping coolant between the reservoir and the supercharger, and a heat exchanger for removing heat from the coolant.

13. The air induction system as claimed in claim 8;

a supercharger support connected to the case and configured to rigidly support the supercharger on the engine, said support including a non-metal thermal-insulating portion, said thermal-insulating portion configured to thermally insulate the supercharger from conductive heating of the case by the engine.

14. The improved air induction system as claimed in claim 13, said non-metal thermal-insulating portion including material with a thermal conductivity of less than about 1 Btu/hr-ft-° F.

15. The improved air induction system as claimed in claim 14, said material being a ceramic material.

16. The improved air induction system as claimed in claim 15, said ceramic material being selected from the group consisting of glass mica, alumina, and combinations thereof.

17. The air induction system as claimed in claim 8, said recirculating induction coolant system being configured to provide supercharger coolant separate from the engine coolant system.

* * * * *